(12) United States Patent
Lee et al.

(10) Patent No.: US 11,926,954 B2
(45) Date of Patent: Mar. 12, 2024

(54) CLOTHES DRYER

(71) Applicant: SAMSUNG ELECTRONICS CO., LTD., Suwon-si (KR)

(72) Inventors: Seulgi Lee, Suwon-si (KR); Youngsu Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 540 days.

(21) Appl. No.: 17/075,254

(22) Filed: Oct. 20, 2020

(65) Prior Publication Data
US 2021/0115618 A1    Apr. 22, 2021

(30) Foreign Application Priority Data

Oct. 21, 2019  (KR) .................. 10-2019-0130525

(51) Int. Cl.
| | |
|---|---|
| *D06F 58/20* | (2006.01) |
| *B01D 46/00* | (2022.01) |
| *B01D 46/10* | (2006.01) |
| *D06F 58/04* | (2006.01) |
| *D06F 58/22* | (2006.01) |
| *D06F 58/26* | (2006.01) |

(52) U.S. Cl.
CPC ....... *D06F 58/203* (2013.01); *B01D 46/0012* (2013.01); *B01D 46/0038* (2013.01); *B01D 46/10* (2013.01); *D06F 58/04* (2013.01); *D06F 58/22* (2013.01); *D06F 58/26* (2013.01); *B01D 2279/35* (2013.01)

(58) Field of Classification Search
CPC ........ D06F 58/203; D06F 58/04; D06F 58/22; D06F 58/26; D06F 39/14; D06F 58/20; D06F 58/12; D06F 2103/56; D06F 2105/34; D06F 2105/38; B01D 46/0012; B01D 46/0038; B01D 46/10; B01D 2279/35
See application file for complete search history.

(56) References Cited

U.S. PATENT DOCUMENTS

| | | | |
|---|---|---|---|
| 6,922,913 B2 | 8/2005 | Hood et al. | |
| 8,702,015 B2 | 4/2014 | Griese et al. | |
| 10,100,459 B2 | 10/2018 | Groppel | |
| 2005/0229653 A1 | 10/2005 | Trinh et al. | |
| 2013/0081299 A1 | 4/2013 | Vasquez | |

FOREIGN PATENT DOCUMENTS

| | | | |
|---|---|---|---|
| KR | 10-2005-0098574 | 10/2005 | |
| KR | 10-2007-0007548 | 1/2007 | |
| KR | 10-2012-0066549 | 6/2012 | |
| KR | 10-2013-0080705 | 7/2013 | |
| KR | 10-2019-0089328 | 7/2019 | |
| WO | WO-2007062471 A1 * | 6/2007 | ............ A01N 25/18 |

OTHER PUBLICATIONS

International Search Report dated Feb. 10, 2021 from International Application No. PCT/KR2020/014023.

\* cited by examiner

*Primary Examiner* — Jessica Yuen
(74) *Attorney, Agent, or Firm* — STAAS & HALSEY LLP

(57) ABSTRACT

A clothes dryer including a device and space for fixing a dryer sheet inside a main body. The clothes dryer includes: a main body including a laundry inlet: a drum rotatably installed inside the main body; a discharge flow path configured to discharge inside air of the drum to outside of the drum; and a sheet receiver accommodating a dryer sheet for providing fragrance to inside of the drum, the sheet receiver positioned on the discharge flow path and detachably installed in the main body.

9 Claims, 13 Drawing Sheets

CLOTHES DRYER

CROSS-REFERENCE TO RELATED APPLICATION

This application is based on and claims priority under 35 U.S.C. § 119 to Korean Patent Application No. 10-2019-0130525, filed on Oct. 21, 2019 in the Korean Intellectual Property Office, the disclosure of which is incorporated by reference herein in its entirety.

BACKGROUND

1. Field

The disclosure relates to a clothes dryer including a device and space for fixing a dryer sheet inside a main body.

2. Description of the Related Art

A clothes dryer is equipment for drying laundry with high-temperature and dry air. When laundry is dried by using a clothes dryer, generally, lint comes out. Such lint is collected to the fan to obstruct the smooth flow of air inside the clothes dryer, thereby interfering with normal operations of the clothes dryer. To prevent the problem, some clothes dryers include a filter for filtering lint.

Also, to add a fragrance to laundry or remove the smell of the laundry, a dryer sheet is put in the drum of the clothes dryer. The dryer sheet is generally made in a shape of a thin paper.

However, when a dryer sheet is put together with laundry in a clothes dryer and then drying is performed, the dryer sheet may be torn into pieces inside the drum to be adhered to the laundry or close the air inlet of the filter, thereby obstructing air circulation inside the clothes dryer. The dryer sheet torn into pieces and adhered to the laundry should be removed by a user, and it takes a lot of time to remove the pieces of the dryer sheet. Also, the dryer sheet closing the air inlet of the filter to obstruct air circulation may deteriorate the drying performance of the clothes dryer.

SUMMARY

In accordance with an aspect of the disclosure, a clothes dryer includes: a main body including a laundry inlet; a drum rotatably installed inside the main body; a discharge flow path configured to discharge inside air of the drum to outside of the drum; and a sheet receiver accommodating a dryer sheet for providing fragrance to inside of the drum, the sheet receiver positioned on the discharge flow path and detachably installed in the main body.

The clothes dryer may further include: a filter duct forming a portion of the discharge flow path and extending downward from the laundry inlet; and a filter configured to filter foreign materials included in air entered the filter duct, and detachably installed in the filter duct.

The sheet receiver may be detachably installed in front of the filter, wherein air discharged to the outside of the drum may pass through the filter and then pass through the sheet receiver.

The sheet receiver may include a first case including a plurality of air inlets through which air enters, and a second case being rotatable with respect to the first case, coupled to the first case to form an accommodating space accommodating the dryer sheet, and including a plurality of air outlets through which air is discharged.

The clothes dryer may further include a sheet installing portion accommodating the sheet receiver, wherein the sheet receiver may be detachably installed in the sheet installing portion.

The sheet receiver may include a magnet fixed in an inside space of the sheet receiver accommodating the dryer sheet.

The sheet installing portion may include a magnet sensor configured to sense a magnetic force of the magnet.

The magnet may face the magnet sensor as a result of installation of the sheet receiver in the sheet installing portion.

The sheet receiver may be detachably installed inside the filter, and separated from or installed in the filter duct together with the filter.

The main body may further include a rim being in a shape of a circle, forming the laundry inlet, and connecting the inside of the drum to outside of the main body.

The sheet receiver may be detachably installed in a portion of the rim.

The clothes dryer may further include a door rotatably coupled to the main body and configured to open and close the laundry inlet.

The sheet receiver may be detachably installed on a rear surface of the door.

The clothes dryer may further include: a heat exchanger provided inside the main body and configured to supply high-temperature and dry air to the inside of the drum; and a blocking member configured to prevent the heat exchanger from communicating with the outside of the main body, the blocking member forming a portion of the discharge flow path together with the filter duct and detachably coupled to the main body.

The sheet receiver may be detachably installed in the blocking member and positioned on the discharge flow path formed by the blocking member.

In accordance with another aspect of the disclosure, a clothes dryer includes: a main body including a laundry inlet; a door rotatably coupled to a front side of the main body and configured to open and close the laundry inlet; a drum rotatably installed in the main body; an air flow path including a supply flow path supplying air to behind the drum and a discharge flow path discharging air in a front direction from the drum; and a sheet receiver accommodating a dryer sheet for providing fragrance, and positioned on the air flow path to provide fragrance to inside of the drum.

The clothes dryer may further include: a filter duct forming a portion of the discharge flow path, and extending downward from the laundry inlet; and a filter configured to filter foreign materials included in air entered the filter duct, and detachably installed in the filter duct.

The sheet receiver may be detachably installed in front of the filter, wherein air discharged to the outside of the drum may pass through the filter and then pass through the sheet receiver.

The clothes dryer may further include a sheet installing portion accommodating the sheet receiver, wherein the sheet receiver may be detachably installed in the sheet installing portion.

The sheet receiver may include a magnet fixed in an inside space of the sheet receiver accommodating the dryer sheet.

The sheet installing portion may include a magnet sensor configured to sense a magnetic force of the magnet.

The sheet receiver may be detachably installed inside the filter, and separated from or installed in the filter duct together with the filter.

The main body may further include a rim being in a shape of a circle, forming the laundry inlet, and connecting the inside of the drum to outside of the main body.

The sheet receiver may be detachably installed in a portion of the rim.

In accordance with another aspect of the disclosure, a clothes dryer includes: a main body; a drum rotatably installed in the main body; a filter configured to filter foreign materials included in air discharged to outside of the drum, and detachably installed in the main body; and a sheet receiver accommodating a dryer sheet for providing fragrance, detachably installed in the main body, and positioned in front of the filter, wherein the air discharged to the outside of the drum passes through the filter and then passes through the dryer sheet.

Additional aspects of the disclosure will be set forth in part in the description which follows and, in part, will be obvious from the description, or may be learned by practice of the disclosure.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Configurations illustrated in the embodiments and the drawings described in the present specification are only the preferred embodiments of the disclosure, and thus it is to be understood that various modified examples, which may replace the embodiments and the drawings described in the present specification, are possible when filing the present application.

The terms used in the present specification are merely used to describe the embodiments, and are not intended to limit the disclosure. An expression used in the singular encompasses the expression of the plural, unless it has a clearly different meaning in the context. In the present specification, it is to be understood that the terms such as "including" or "having," etc., are intended to indicate the existence of the features, numbers, operations, components, parts, or combinations thereof disclosed in the specification, and are not intended to preclude the possibility that one or more other features, numbers, operations, components, parts, or combinations thereof may exist or may be added.

It will be understood that, although the terms "first", "second", etc., may be used herein to describe various components, these components should not be limited by these terms. The above terms are used only to distinguish one component from another. For example, a first component discussed below could be termed a second component, and similarly, a second component may be termed a first component without departing from the scope of right of the disclosure.

In the following description, the terms "front end", "rear end", "upper portion", "lower portion", "upper end", and "lower end" are defined based on the drawings, and the shapes and positions of the corresponding components are not limited by the terms.

Throughout the disclosure, the expression "at least one of a, b or c" indicates only a, only b, only c, both a and b, both a and c, both b and c, all of a, b, and c, or variations thereof.

Therefore, it is an aspect of the disclosure to provide a clothes dryer for preventing a dryer sheet from being torn into pieces or from obstructing air circulation inside a drum.

It is another aspect of the disclosure to provide a clothes dryer including a device and space for fixing a dryer sheet inside a main body.

It is another aspect of the disclosure to provide a clothes dryer including a sheet receiver detachably coupled to a main body and accommodating a dryer sheet therein.

It is another aspect of the disclosure to provide a clothes dryer capable of increasing an effect of a dryer sheet by positioning the dryer sheet on an air circulation path.

Hereinafter, the embodiments of the disclosure will be described in detail with reference to the accompanying drawings.

Figure 1:
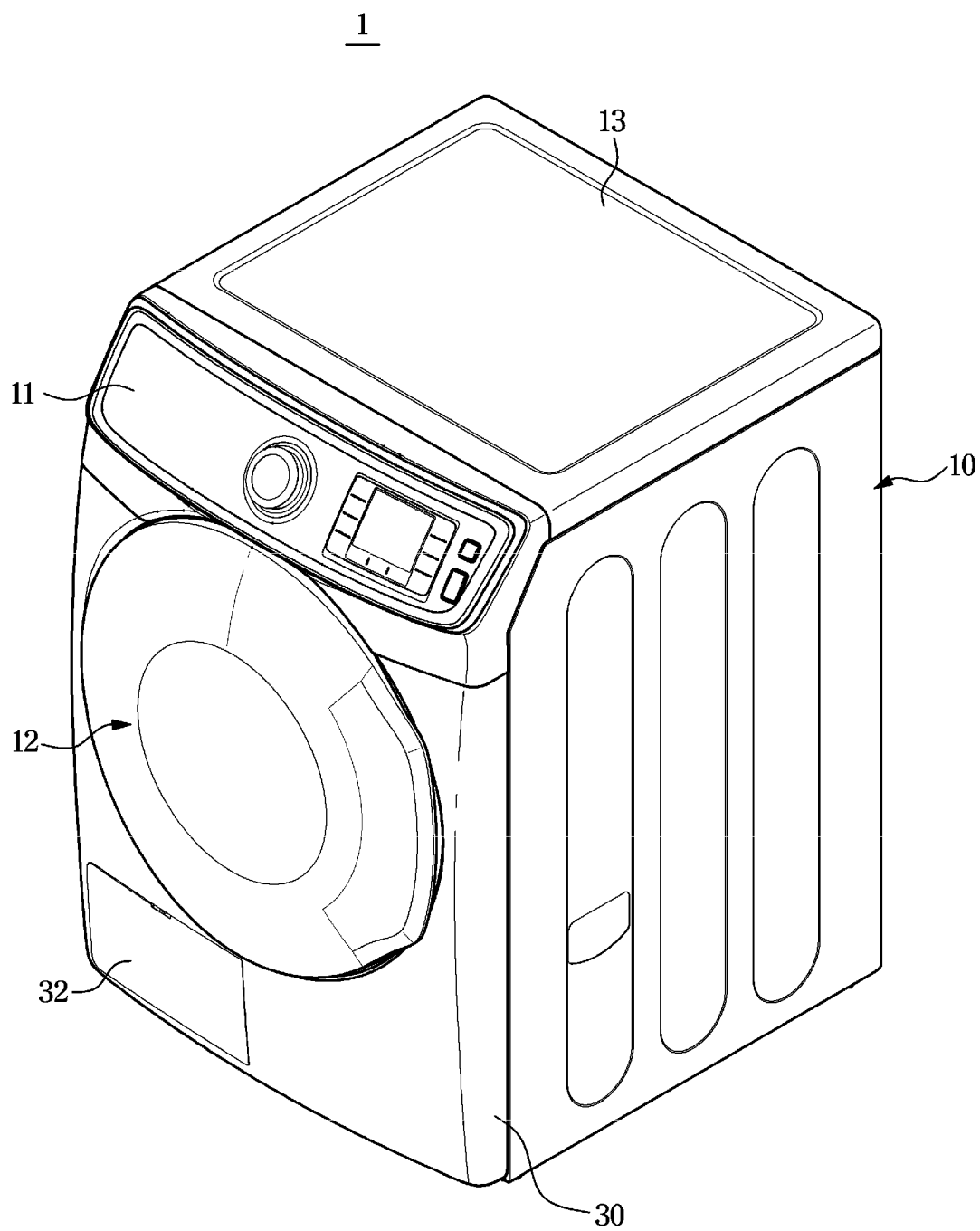
FIG. 1 is a perspective view of a clothes dryer according to an embodiment of the disclosure when a door is closed.
Figure 2:
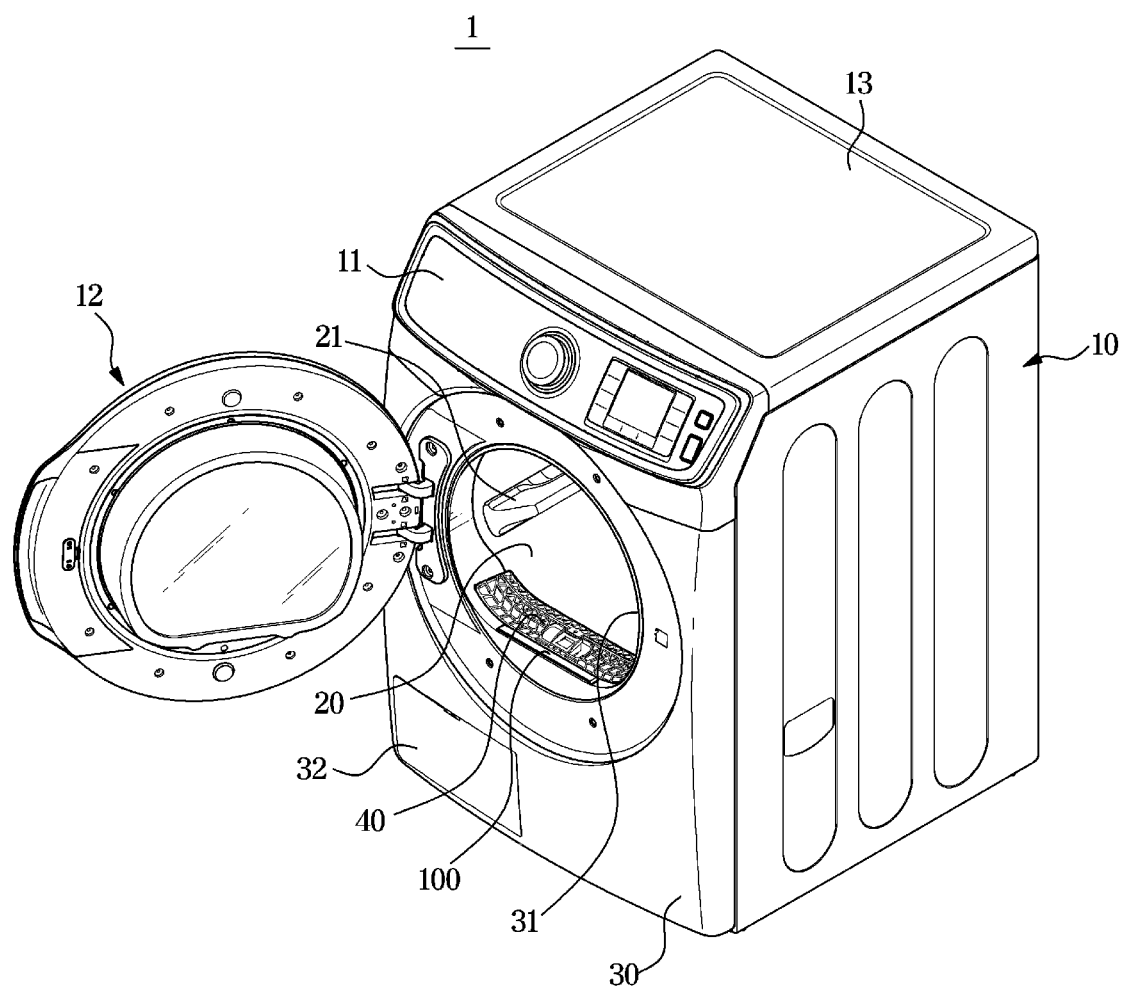
FIG. 2 is a perspective view of a clothes dryer according to an embodiment of the disclosure when a door opens.
Figure 3:
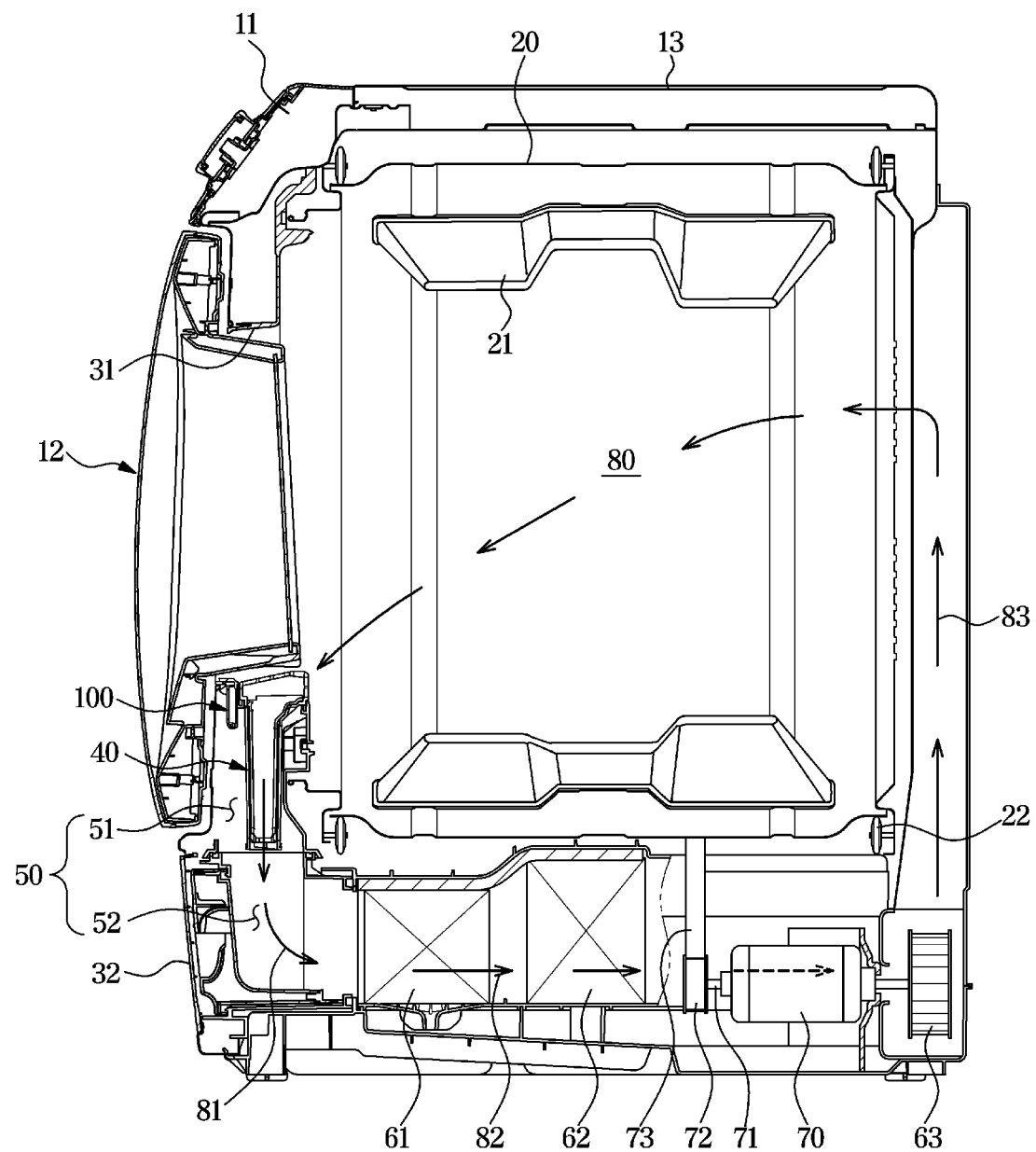
FIG. 3 is a cross-sectional view of a clothes dryer according to an embodiment of the disclosure.

FIG. 1 is a perspective view of a clothes dryer according to an embodiment of the disclosure when a door is closed. FIG. 2 is a perspective view of a clothes dryer according to an embodiment of the disclosure when a door opens. FIG. 3 is a cross-sectional view of a clothes dryer according to an embodiment of the disclosure.

A clothes dryer 1 may include a main body 10 forming an outer appearance, and a drum 20 rotatably installed inside the main body 10.

The main body 10 may be substantially in a shape of a hexahedron. In a front side of the main body 10, a laundry inlet 31 may be formed to put or take laundry (not show) which is an object to be dried in or out of the drum 20. The laundry inlet 31 may be opened or closed by a door 12.

In a front upper portion of the main body 10, a control panel 11 for controlling operations of the clothes dryer 1 may be positioned. In the control panel 11, an inputter for inputting an operation of the clothes dryer 1 may be provided in a form of a rotatable jog dial, and a display for displaying various information about the clothes dryer 1 may be provided. However, the control panel 11 is not limited to these, and may include various types of inputters and displays.

Inside the main body 10, the drum 20 being in a shape of a cylinder may be provided. The drum 20 may rotate by receiving power of a driving apparatus. The driving apparatus for rotating the drum 20 will be described later.

The main body 10 may include a front cover 30 forming the front side, a top cover 13 forming a top, and a base (not shown) forming a bottom. According to an embodiment of the disclosure, the front cover 30, the top cover 13, and the base constructing the main body 10 may be manufactured separately and then assembled into one body, although not limited thereto. However, at least some of the front cover 30, the top cover 13, and the base may be integrated into one body.

The clothes dryer 1 may include the door 12 for opening or closing the laundry inlet 31 which is an opening formed in the front cover 30. A user may open the door 12 to put or take an object to be dried in or out of the drum 20 through the laundry inlet 31.

A heat exchanger cover 32 for enabling the user to access a heat exchanger 61 may be detachably coupled to the front cover 30 of the main body 10.

According to an embodiment of the disclosure, the clothes dryer 1 may include a sheet receiver 100 and a filter 40 detachably coupled to the front cover 30. The filter 40 may filter foreign materials included in inside air of the drum 20. The sheet receiver 100 may accommodate a dryer sheet for providing fragrance to the inside of the drum 20.

Hereinafter, basic operations of the clothes dryer 1 and flow of air inside the clothes dryer 1 will be described with reference to FIG. 3.

The drum 20 may be positioned inside the main body 10 to rotate on a rotating axis that is substantially horizontal to the ground. On an inner circumference surface of the drum 20, a lifter 21 may be formed to lift an object to be dried according to a rotation of the drum 20. According to a rotation of the drum 20, the object to be dried may rise and fall repeatedly by the lifter 21. On an outer circumference surface of the drum 20, a roller 22 may be provided to support the drum 20 such that the drum 20 rotates smoothly.

The drum 20 may receive power by the driving apparatus to rotate. The driving apparatus may be positioned in a lower area inside the main body 10. The driving apparatus may be mounted on the base.

The driving apparatus may include a motor 70, and a pulley 72 and a belt 73 for transferring power of the motor 70 to the drum 20. The pulley 72 may be connected to a rotating shaft 71 connected to the motor 70. According to a rotation of the rotating shaft 71 by the motor 70, the pulley 72 may rotate together with the rotating shaft 71. The belt 73 may be wound around an outer surface of the pulley 72 and an outer surface of the drum 20. According to a rotation of the belt 73 by a driving force of the motor 70, the drum 20 may rotate together with the belt 73.

The drum 20 may accommodate an object to be dried therein to dry the object. In the main body 10, a flow path 80 for circulating dry air to the drum 20 may be formed. Also, in a lower rear area of the main body 10, a fan 63 may be provided to cause air to flow along the flow path 80.

The flow path 80 may include a discharge flow path 81 for discharging air from inside of the drum 20 to outside of the drum 20, a connection flow path 82 for drying the air discharged from the drum 20, and a supply flow path 83 for supplying the dry air to the inside of the drum 20.

On the discharge flow path 81, the filter 40 may be positioned to filter foreign materials included in inside air of the drum 20. On the connection flow path 82, heat exchangers 61 and 62 may be positioned in succession. Air passed through the connection flow path 82 may change to high-temperature and dry air. The high-temperature and dry air which has passed through the discharge flow path 81 and the connection flow path 82 and from which foreign materials have been filtered may be again supplied to the inside of the drum 20 via the supply flow path 83. The object to be dried inside the drum 20 may be dried by the high-temperature and dry air. The air that has dried the object to be dried may become high-temperature and humid air, and the high-temperature and humid air inside the drum 20 may be discharged to the outside of the drum 20 through the discharge flow path 81.

The clothes dryer 1 may dry the object to be dried inside the drum 20 by repeatedly performing the above-described process.

Also, the clothes dryer 1 may include a discharge duct 50 forming the discharge flow path 81. The discharge duct 50 may include a filter duct 51 forming an outlet through which inside air of the drum 20 is discharged, wherein the filter 40 and the sheet receiver 100 are installed in the filter duct 51, and a guide duct 52 for guiding air from the filter duct 51 to the heat exchangers 61 and 62.

The heat exchangers 61 and 62 may include an evaporator 61 and a condenser 62. Although not shown in detail in the drawings, a compressor and an expansion valve may be installed in a lower area of the main body 10. Accordingly, the evaporator, the condenser, the compressor, and the expansion valve may construct a heat pump. According to an embodiment of the disclosure, the clothes dryer 1 may include the heat pump, although not limited thereto. The clothes dryer 1 may include a gas type clothes dryer and an electric heater type clothes dryer.

According to an embodiment of the disclosure, the sheet receiver 100 for accommodating a dryer sheet 101 may be positioned outside the drum 20 and fixed at a predefined position.

Referring to FIG. 3, the sheet receiver 100 may be installed in the filter duct 51. More specifically, the sheet receiver 100 may be positioned in front of the filter 40. Because air is supplied from behind the drum 20 and discharged in a front direction from the drum 20, the air may move from behind to front of the drum 20. Because the sheet receiver 100 is positioned in front of the filter 40, air may primarily enter the filter 40, pass through at least one portion of the filter 40, and then secondarily enter the sheet receiver 100.

Because the filter 40 filters foreign materials included in air, air from which foreign materials have been filtered by the filter 40 may enter the sheet receiver 100. Accordingly, it may be possible to prevent foreign materials from being excessively collected in the sheet receiver 100. Also, foreign materials collected in the sheet receiver 100 may be prevented from obstructing air from entering the sheet receiver 100.

When air does not smoothly enter the inside of the sheet receiver 100 or air entering the sheet receiver 100 is not smoothly discharged, it may fail to add fragrance provided from the dryer sheet 101 to air and smoothly transfer the air to an object to be dried.

According to an embodiment of the disclosure, air circulating in the inside of the clothes dryer 1 may pass through the filter 40 before entering the sheet receiver 100, and accordingly, it may be possible to prevent foreign materials from being collected in the sheet receiver 100.

Therefore, air may smoothly enter the inside of the sheet receiver 100, and inside air of the sheet receiver 100 may be smoothly discharged.

Figure 4:
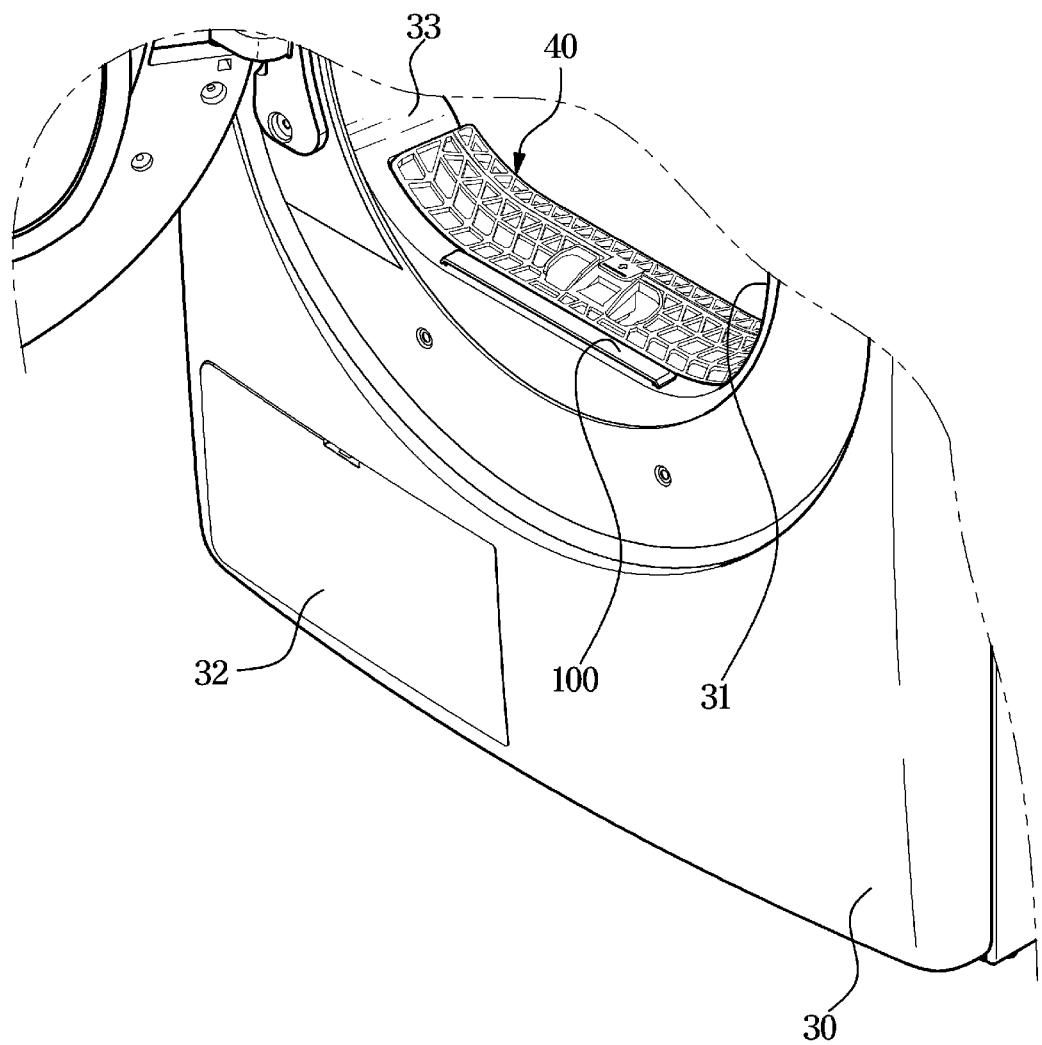
FIG. 4 is an enlarged view of a part of a clothes dryer according to an embodiment of the disclosure.
Figure 5:
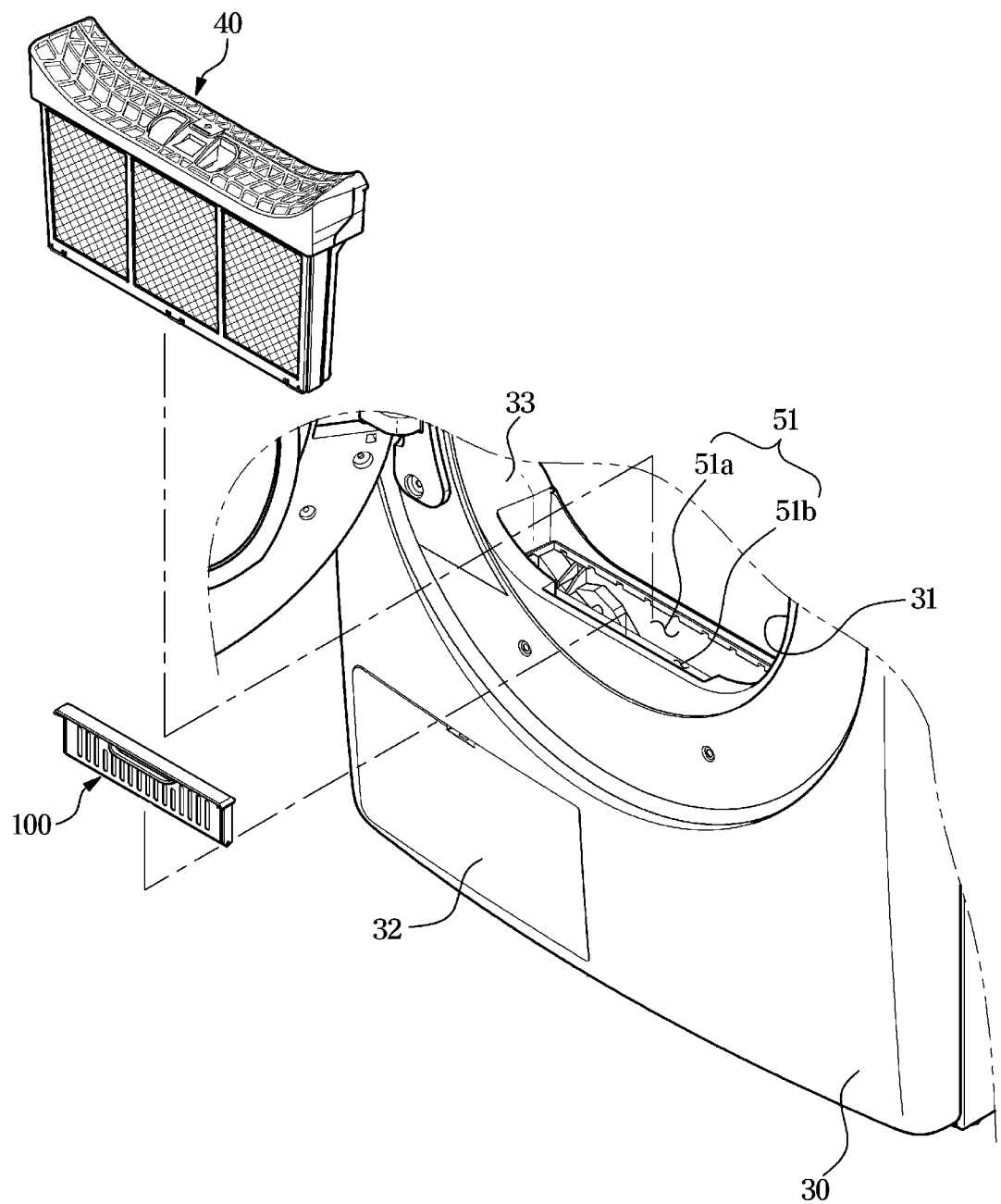
FIG. 5 shows a state in which a sheet receiver is separated from a filter, in the clothes dryer shown in FIG. 4.

FIG. 4 is an enlarged view of a part of a clothes dryer according to an embodiment of the disclosure. FIG. 5 shows a state in which a sheet receiver is separated from a filter, in the clothes dryer shown in FIG. 4.

Referring to FIGS. 4 and 5, a clothes dryer according to an embodiment of the disclosure may include the sheet receiver 100 and the filter 40 detachably installed in the filter duct 51.

The filter duct 51 may be provided in the front cover 30 of the main body 10. More specifically, the front cover 30 may include a rim 33 forming the laundry inlet 31, and the filter duct 51 may be formed below a center of the rim 33. The rim 33 may connect the inside of the drum 20 to the outside of the main body 10, and may be in a shape of a circle.

According to an embodiment of the disclosure, the filter duct 51 may include a filter installing portion 51a in which the filter 40 is detachably installed, and a sheet installing portion 51b in which the sheet receiver 100 is detachably installed.

The filter installing portion 51a may be adjacent to the sheet installing portion 51b in a front-back direction. Accordingly, the filter 40 and the sheet receiver 100 may be positioned in succession in the front-back direction. In other words, the sheet receiver 100 may be positioned in front of the filter 40.

Generally, in a process in which the clothes dryer 1 dries an object to be dried, lint may be generated, and the filter 40 may filter and store the lint. After finishing drying, a user may separate the filter 40 from the filter installing portion 51a to remove the lint. After removing the lint, the user may again install the filter 40 in the filter installing portion 51a and then operate the clothes dryer 1.

Likewise, the user may separate the sheet receiver 100 from the sheet installing portion 51b, insert a dryer sheet 101 (see FIG. 6) into the sheet receiver 100, and then, install the sheet receiver 100 in the sheet installing portion 51b.

Typically, users have put a dryer sheet made in a shape of a paper to the inside of a drum together with an object to be dried, and then operated a clothes dryer. However, in this case, the dryer sheet has moved together with the object to be dried according to a rotation of the drum to be torn into pieces because the dryer sheet is thin and light, and the pieces of the dryer sheet have been adhered to the object to be dried or absorbed to a filter, thereby obstructing air circulation.

According to a concept of the disclosure, the clothes dryer 1 may include the sheet receiver 100 for accommodating a dryer sheet, and the sheet receiver 100 may be fixed outside the drum 20. Accordingly, the dryer sheet may be prevented in advance from being torn into pieces or absorbed to the filter 40 to obstruct air circulation.

Also, the sheet receiver 100 may be positioned on a flow path of air passing through the drum 20 and circulating to effectively provide fragrance to an object to be dried without directly contacting the object to be dried.

Also, after an operation of the clothes dryer 1 terminates, the user may separate the sheet receiver 100 from the main body 10, and then easily remove the dryer sheet from the sheet receiver 100. Accordingly, use convenience of the clothes dryer 1 may be improved.

Figure 6:
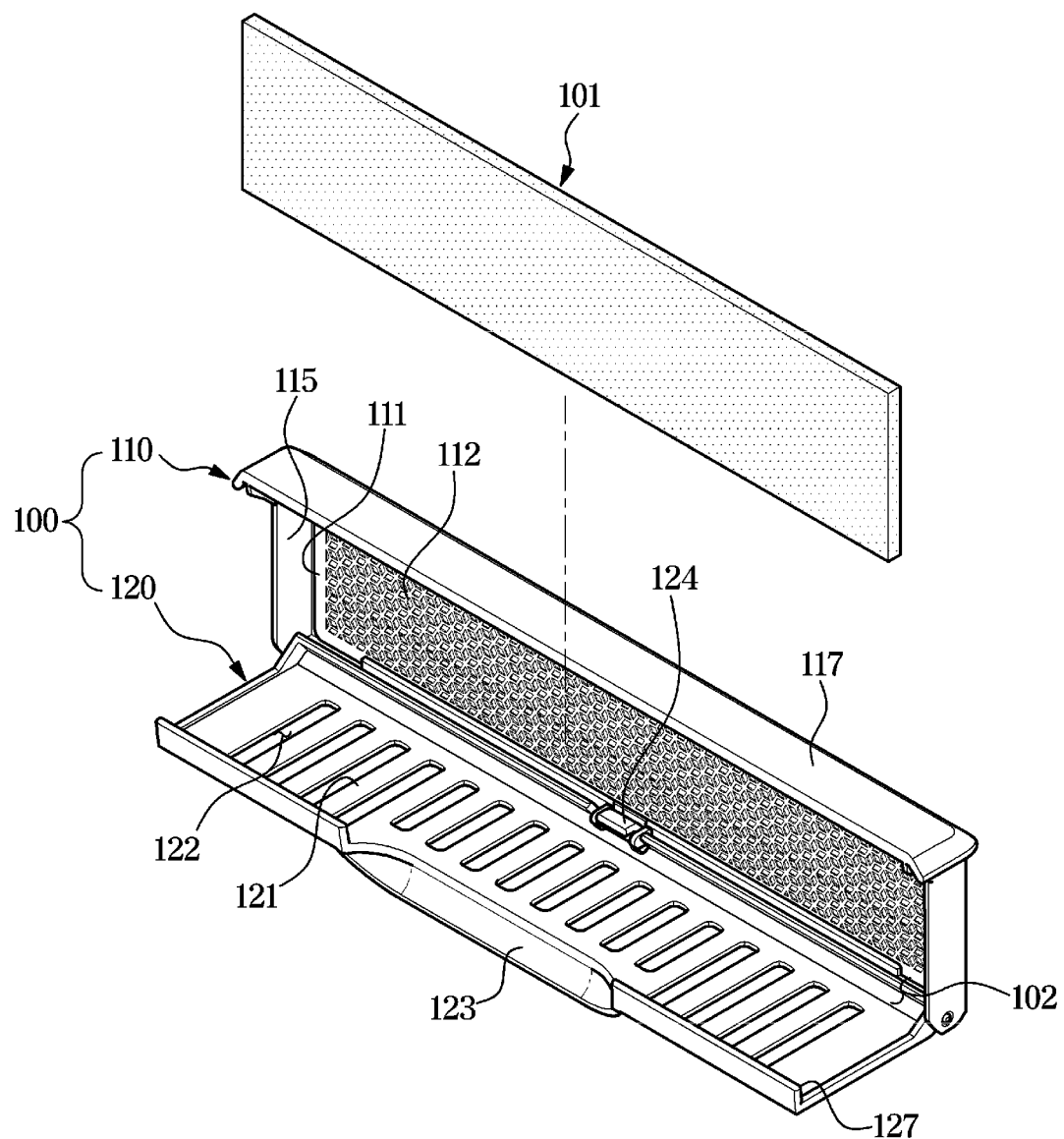
FIG. 6 shows a sheet receiver and a dryer sheet in a clothes dryer according to an embodiment of the disclosure.
Figure 7:
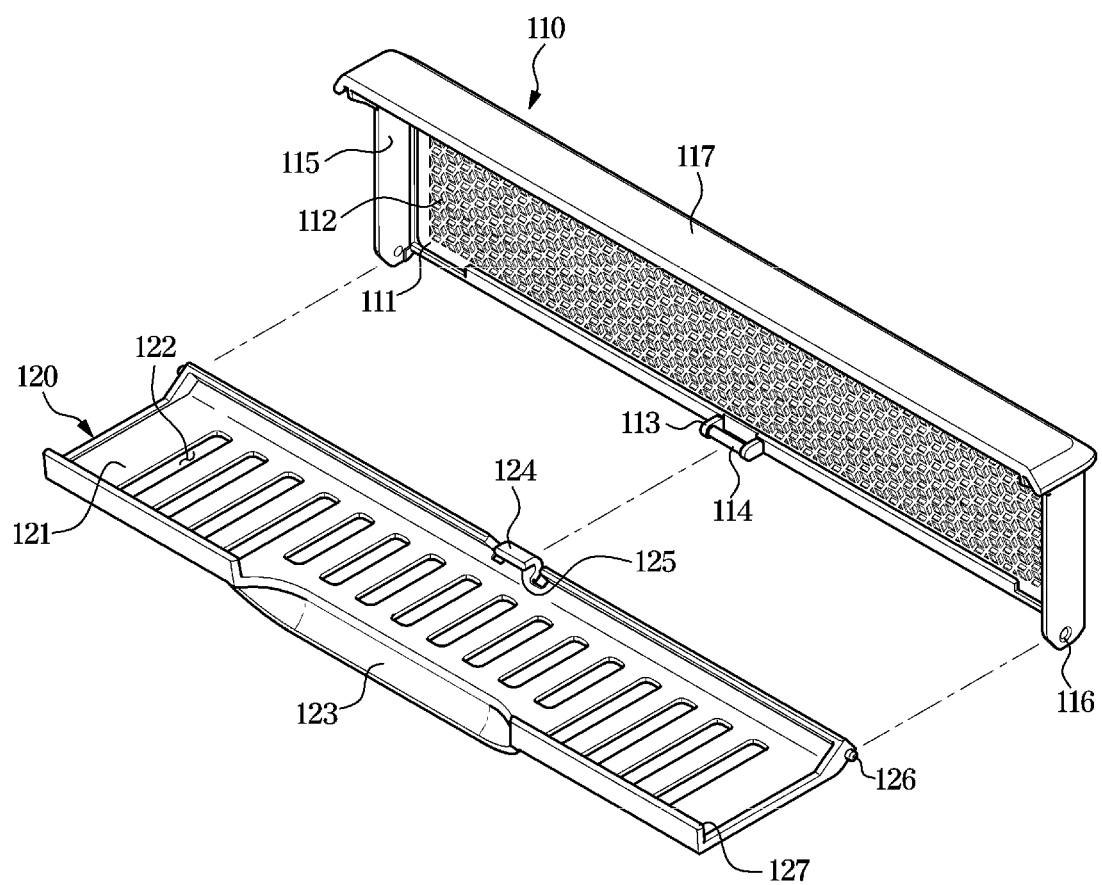
FIG. 7 is an exploded view of a sheet receiver in a clothes dryer according to an embodiment of the disclosure.

FIG. 6 shows a sheet receiver and a dryer sheet in a clothes dryer according to an embodiment of the disclosure. FIG. 7 is an exploded view of a sheet receiver in a clothes dryer according to an embodiment of the disclosure.

Referring to FIG. 6, the sheet receiver 100 according to an embodiment of the disclosure may include a receiving space 102 therein, and accommodate the dryer sheet 101 in the receiving space 102. The sheet receiver 100 may accommodate the dryer sheet 101 being in a shape of a paper therein, although not limited thereto. However, various shapes of flavored agents, instead of the shape of a paper, may be accommodated in the sheet receiver 100 as long as they are capable of being accommodated in the receiving space 102 of the sheet receiver 100.

The sheet receiver 100 may include a first case 110, and a second case 120 rotatably coupled to the first case 110. A user may grip the first case 110 and then rotate the second case 120 to open the sheet receiver 100. After opening the sheet receiver 100, the user may remove the dryer sheet 101 accommodated in the receiving space 102 or insert the dryer sheet 101 into the receiving space 102.

The first case 110 may include a first plate 111 being in a type of a plate to face one surface of the dryer sheet 101. The first plate 111 may include a plurality of first holes 112 penetrating the first plate 111 to receive air from outside of the first plate 111.

The second case 120 may include a second plate 121 being in a shape of a plate and facing the other surface of the dryer sheet 101, which is opposite to the one surface of the dryer sheet 101. The second plate 121 may include a plurality of second holes 122 penetrating the second plate 121 to discharge air from inside of the second plate 121.

The second case 120 may include a handle 123 that the user grips to rotate the second case 120 with respect the first case 110.

Hereinafter, a structure of the sheet receiver 100 according to an embodiment of the disclosure will be described in detail with reference to FIG. 7.

Referring to FIG. 7, the first case 110 may include the first plate 111, the plurality of first holes 112, a shaft 114 provided at a lower center portion of the first plate 111, and a shaft support 113 formed at both ends of the shaft 114 to support the shaft 114. The shaft support 113 may protrude from the lower center portion of the first plate 111 toward the front direction, as seen from FIG. 7. The both ends of the shaft 114 may be connected to front ends of the shaft support 113. Accordingly, a predefined space may be formed between the shaft 114 and the first plate 111.

The first case 110 may include side portions 115 bent and extending in the front direction from both side ends of the first plate 111. The first case 110 may include a pair of side portions 115, wherein each side portion 115 may include an inserting hole 116. The inserting hole 116 may be adjacent to a lower end of the side portion 115.

Also, the first case 110 may include a top portion 117 bent and extending in the front direction from an upper end of the first plate 111 as seen from FIG. 7. A length in front-back direction of the top portion 117 may be longer than that in front-back direction of the side portion 115.

The second case 120 may include the second plate 121, the plurality of second holes 122 penetrating the second plate 121, the handle 123 that the user grips, and a coupling protrusion 124 formed at a rear lower end of the second plate 121 as seen from FIG. 7. The handle 123 may be formed at a front center end of the second plate 121 as seen from FIG. 7. The coupling protrusion 124 may be in a shape of a pipe having an open front side, and form an inserting recess 125 in which the shaft 114 is rotatably inserted.

Also, the second case 120 may include a rotating protrusion 126 inserted in the inserting hole 116 of the first case 110 and rotating, and a rib 127 coupled to the second case 120 to cover a upper portion of the dryer sheet 101.

Due to the above-described structure of the sheet receiver 100, the sheet receiver 100 may be detachably installed in the sheet installing portion 51b. Also, when the sheet receiver 100 is separated from the sheet installing portion 51b, the second case 120 may rotate with respect to the first case 110 to open. After the sheet receiver 100 opens, the dryer sheet 101 may be accommodated in the sheet receiver 100, and then the second case 120 may rotate to close the sheet receiver 100. Through the structure, as described above, the user may easily accommodate the dryer sheet 101 in the sheet receiver 100, and then install the sheet receiver 100 in the sheet installing portion 51b.

Figure 8:
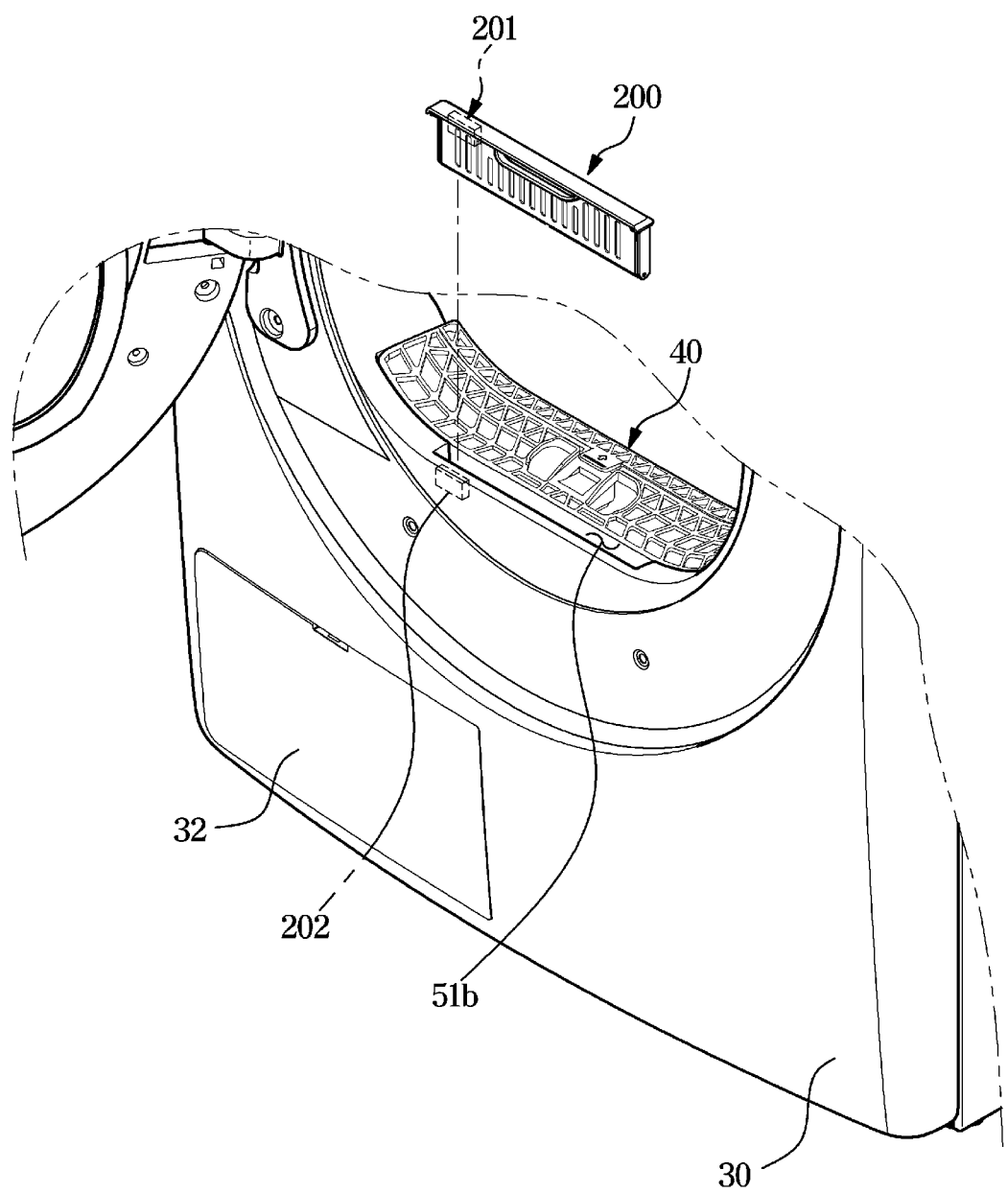
FIG. 8 shows a sheet receiver separated from a clothes dryer according to another embodiment of the disclosure.

FIG. 8 shows a sheet receiver separated from a clothes dryer according to another embodiment of the disclosure.

Hereinafter, a clothes dryer according to another embodiment of the disclosure will be described with reference to FIG. 8. In the following descriptions, descriptions overlapping with those given above will be omitted.

According to another embodiment of the disclosure, a sheet receiver 200 may further include a magnet 201 therein. Also, in one side of the sheet installing portion 51b, a magnet sensor 202 may be provided to sense a magnetic force of the magnet 201. However, a magnet sensor may be provided inside the sheet receiver 200, and a magnet may be provided in one side of the sheet installing portion 51b.

The magnet 201 may be fixed inside the sheet receiver 200. That is, the magnet 201 may be fixed at a predefined location of the sheet receiver 200 regardless of whether a dryer sheet is replaced.

The magnet sensor 202 may be fixed in one side of the sheet installing portion 51b. The magnet sensor 202 may face the magnet 201 as a result of installation of the sheet receiver 200 in the sheet installing portion 51b.

According to another embodiment of the disclosure, by sensing a magnetic force of the magnet 201 through the magnet sensor 202, a controller (not shown) may identify whether the sheet receiver 200 has been installed.

The clothes dryer may include the controller (not shown), and the controller may receive information about whether a magnetic force of the magnet 201 is sensed from the magnet sensor 202. The controller may determine that the sheet receiver 200 has been installed in the sheet installing portion 51b, in response to sensing of a magnet force of the magnet 201 by the magnet sensor 202. After the controller determines that the sheet receiver 200 has been installed in the sheet installing portion 51b, the controller may operate the clothes dryer according to the user's input.

When the magnet sensor 202 fails to sense a magnetic force of the magnet 201, the controller may determine that the sheet receiver 200 has not been installed in the sheet installing portion 51b. When the controller determines that the sheet receiver 200 has not been installed in the sheet installing portion 51b, the controller may not operate the clothes dryer although the user makes an input of operating the clothes dryer. Also, the controller may display information indicating that the sheet receiver 200 has not been installed through the display of the control panel 11, for the user. Also, the controller may inform the user that the sheet receiver 200 has not been installed in the sheet installing portion 51b by sounding an alarm through a speaker (not shown).

The user may recognize that the sheet receiver 200 has not been installed through the display and/or speaker. Accordingly, the user may install the sheet receiver 200 in the sheet installing portion 51b, and then again operate the clothes dryer. After the sheet receiver 200 is installed in the sheet installing portion 51b, the controller may operate the clothes dryer according to the user's input.

Figure 9:
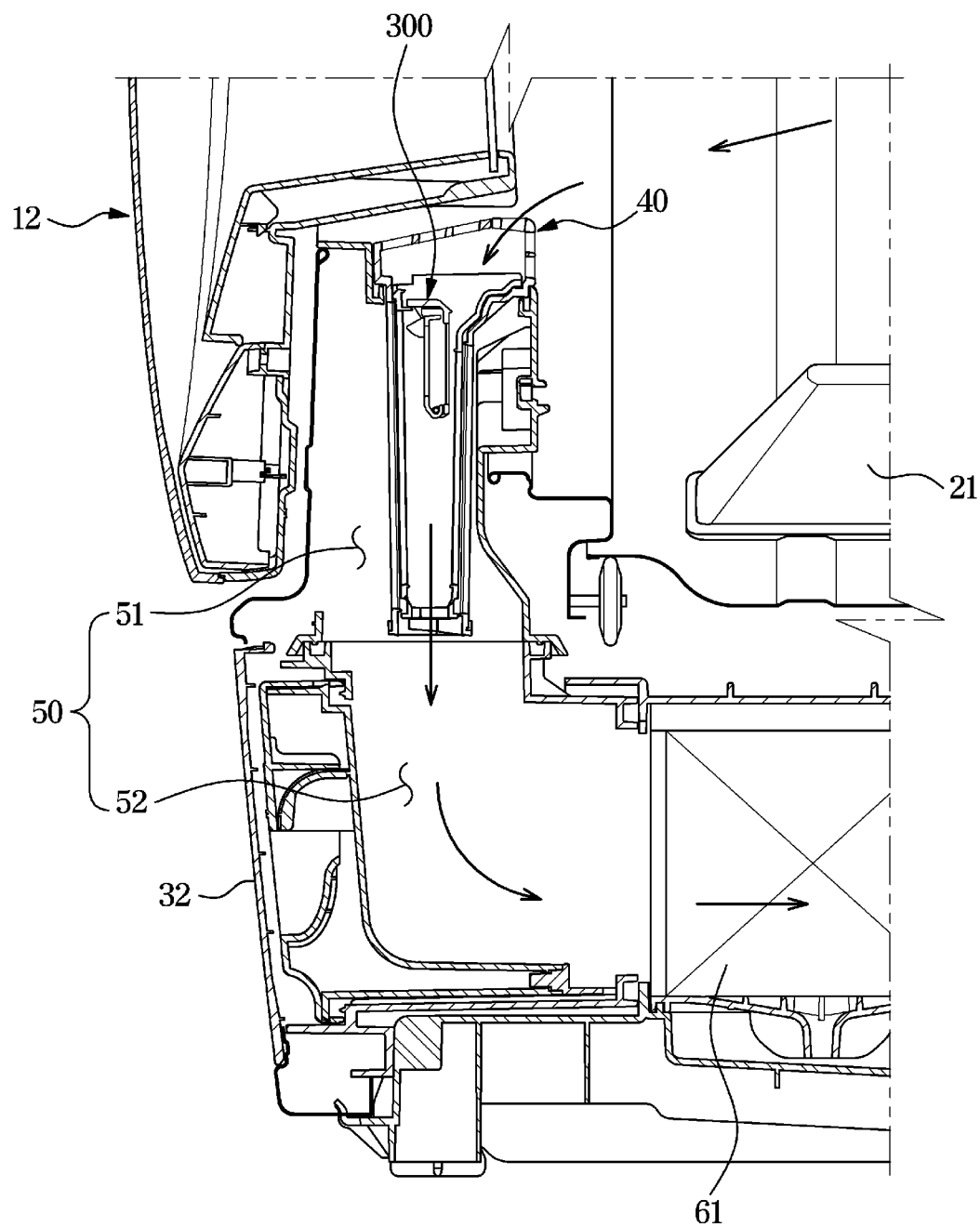
FIG. 9 is a cross-sectional view of a clothes dryer according to another embodiment of the disclosure.

FIG. 9 is a cross-sectional view of a clothes dryer according to another embodiment of the disclosure.

Hereinafter, a clothes dryer according to another embodiment of the disclosure will be described with reference to FIG. 9. In the following descriptions, descriptions overlapping with those given above will be omitted.

Referring to FIG. 9, in the clothes dryer according to another embodiment of the disclosure, a sheet receiver 300 may be detachably installed inside the filter 40. More specifically, after the filter 40 is separated from the filter installing portion 51a, the filter 40 may open, and the sheet receiver 300 may be installed inside the filter 40.

According to another embodiment of the disclosure, the filter 40 and the sheet receiver 300 may be provided in a form of an assembly. A user may separate the filter 40 from the filter installing portion 51a, remove dust collected in the filter 40, and separate the sheet receiver 300 installed inside the filter 40 from the filter 40. The user may separate the filter 40 without individually separating the filter 40 and the sheet receiver 300 from the main body 10, thereby separating the sheet receiver 300 from the main body 10. Accordingly, the use convenience of the clothes dryer may be improved.

Figure 10:
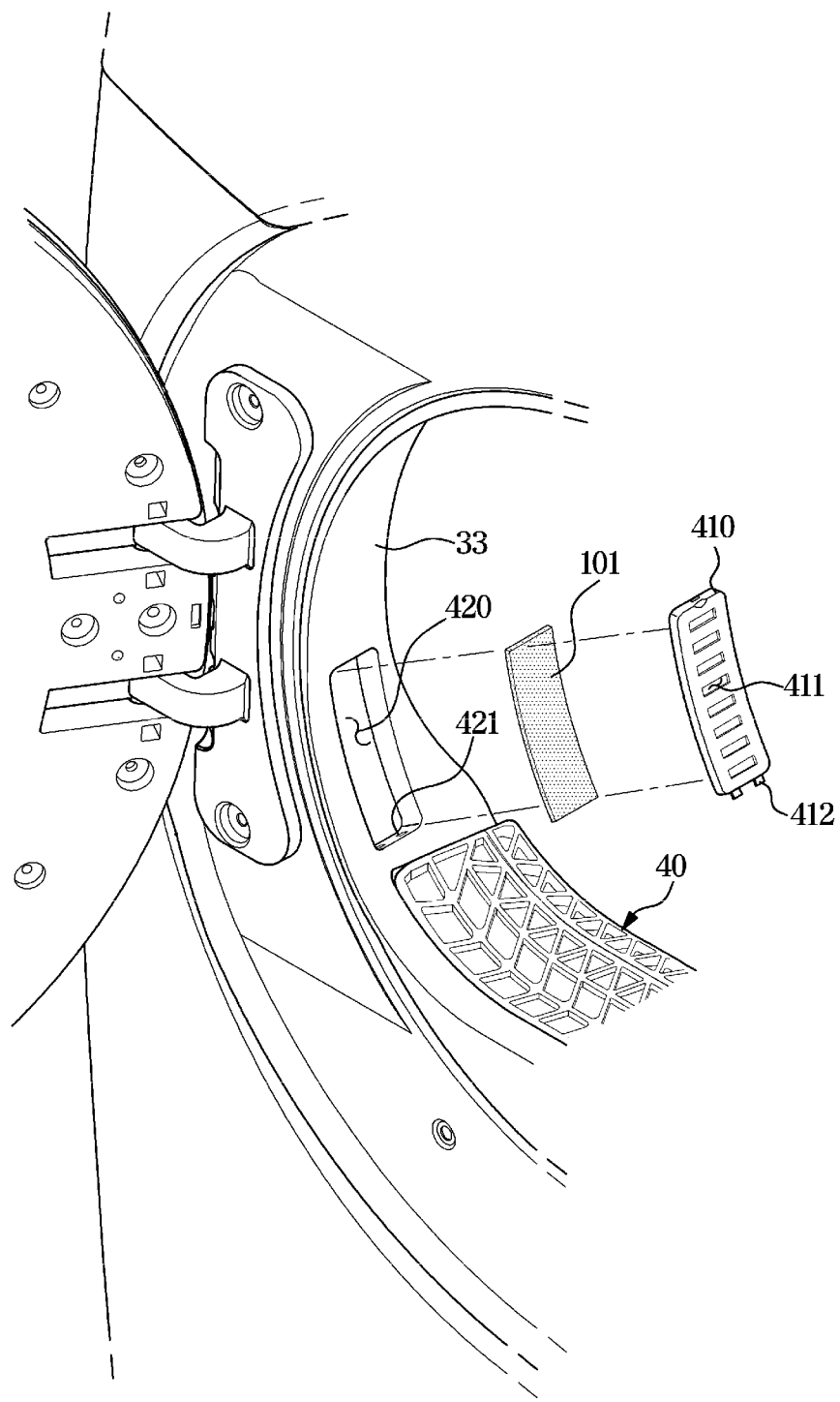
FIG. 10 is an enlarged view of a part of a clothes dryer according to another embodiment of the disclosure.

FIG. 10 is an enlarged view of a part of a clothes dryer according to another embodiment of the disclosure.

Hereinafter, a clothes dryer according to another embodiment of the disclosure will be described with reference to FIG. 10. In the following descriptions, descriptions overlapping with those given above will be omitted.

Referring to FIG. 10, in the clothes dryer according to another embodiment of the disclosure, the dryer sheet 101 may be accommodated in a portion of the rim 33 forming the laundry inlet 31.

According to another embodiment of the disclosure, a sheet receiver 400 may include a plate body 410, and a plurality of plate holes 411 penetrating the plate body 410 to receive and discharge air. The plate body 410 may include a protrusion 412 that is inserted in an installing recess 421 of a plate installing portion 420 which will be described later.

The plate installing portion 420 may be formed in a portion of the rim 33. The plate installing portion 420 may be formed as a recess being in a shape of a parallelepiped, and correspond to the plate body 410. In the plate installing portion 420, the installing recess 421 in which the protrusion 412 of the plate body 410 is inserted may be formed.

The user may separate the plate body 410 from the plate installing portion 420, and then insert the dryer sheet 101 into the plate installing portion 420. After the user inserts the dryer sheet 101 into the plate installing portion 420, the user may install the plate body 410 in the plate installing portion 420 to prevent the dryer sheet 101 from being separated from the plate installing portion 420.

In FIG. 10, the plate installing portion 420 is formed in a portion of the rim 33 where a hinge of a door is positioned, although not limited thereto. However, the plate installing portion 420 may be formed in the other portion of the rim 33 where a handle of the door is positioned. Also, the plate installing portion 420 may be formed at an upper end of the laundry inlet 31.

Figure 11:
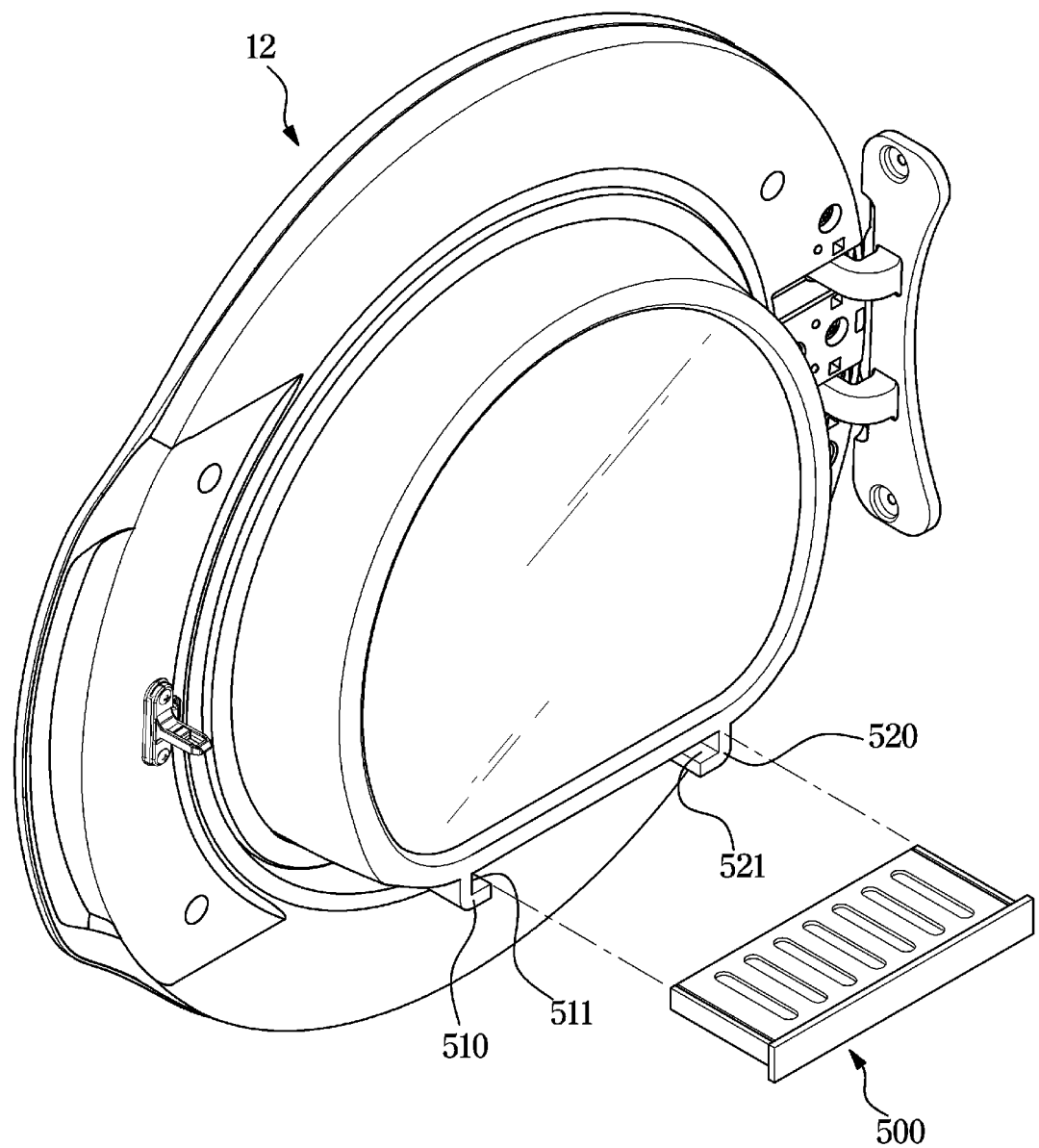
FIG. 11 is an exploded view of a door and a sheet receiver in a clothes dryer according to another embodiment of the disclosure.

FIG. 11 is an exploded view of a door and a sheet receiver in a clothes dryer according to another embodiment of the disclosure.

Hereinafter, a clothes dryer according to another embodiment of the disclosure will be described with reference to FIG. 11. In the following descriptions, descriptions overlapping with those given above will be omitted.

Referring to FIG. 11, in the clothes dryer according to another embodiment of the disclosure, a sheet receiver 500 may be detachably installed on a rear surface of the door 12.

On the rear surface of the door 12, a pair of guide portions 510 and 520 to which the sheet receiver 500 is coupled may be provided. The guide portions 510 and 520 may guide side portions of the sheet receiver 500 and a portion of a bottom of the sheet receiver 500. The guide portions 510 and 520 may respectively include guide recesses 511 and 512 in which at least one portion of the sheet receiver 500 is inserted.

A user may insert the sheet receiver 500 into the guide recesses 511 and 512 and then cause the sheet receiver 500 to slide, thereby coupling the sheet receiver 500 to the guide portions 510 and 520. On the contrary, the user may cause the sheet receiver 500 to slide in a direction of taking the sheet receiver 500 out of the guide portions 510 and 520, thereby separating the sheet receiver 500 from the guide portions 510 and 520.

Figure 12:
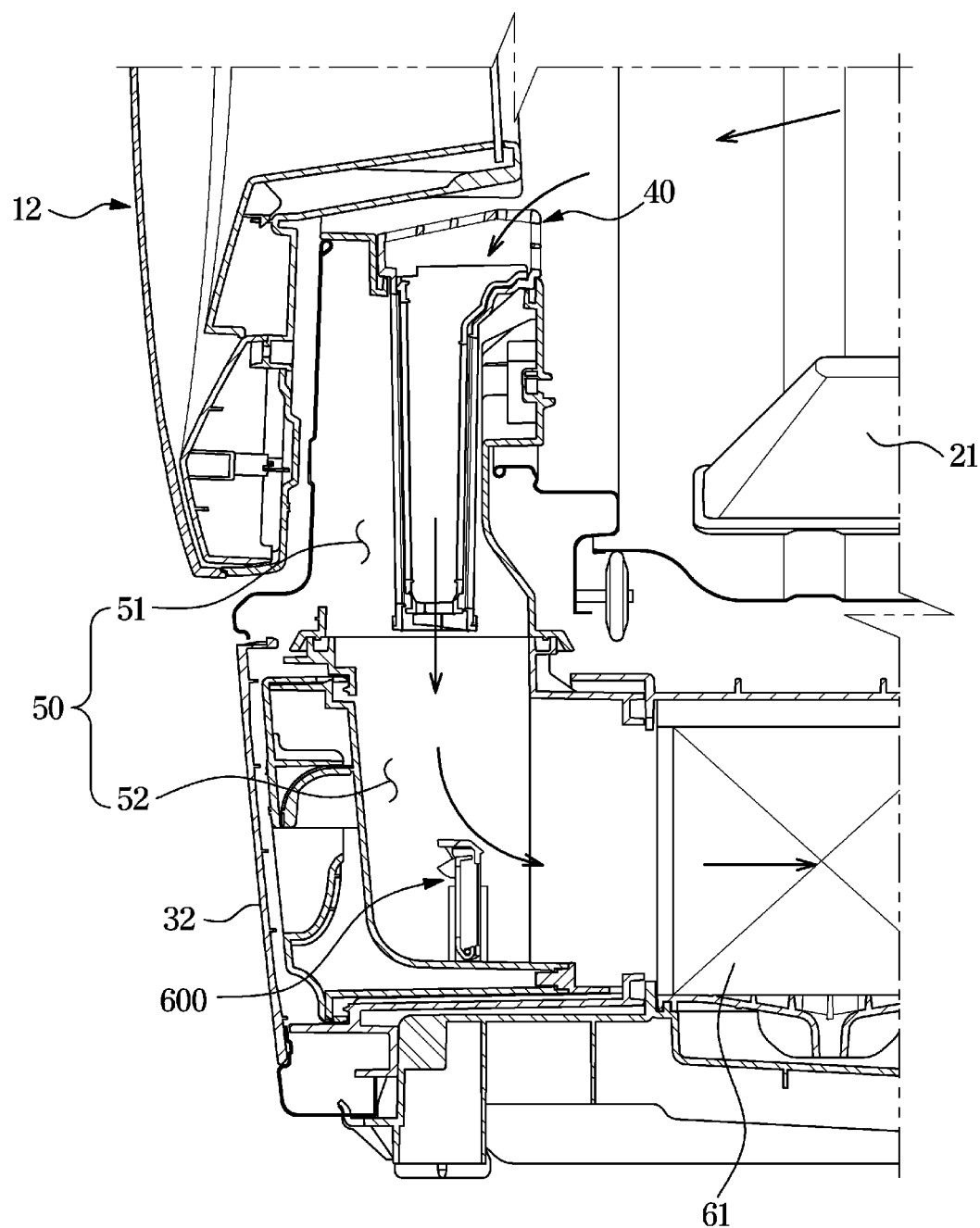
FIG. 12 is a cross-sectional view of a clothes dryer according to another embodiment of the disclosure.
Figure 13:
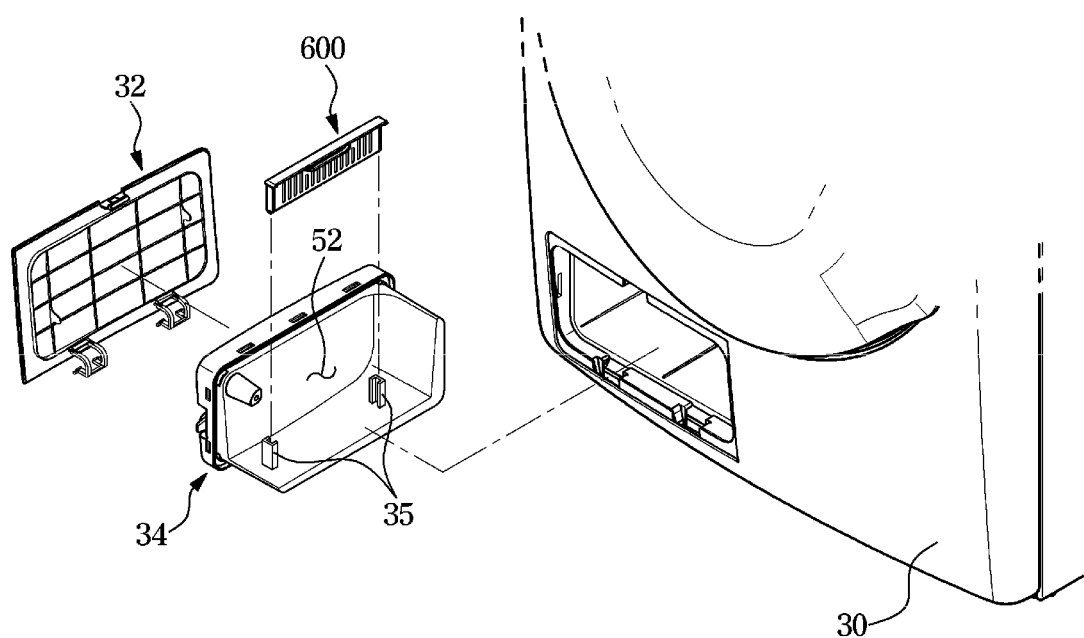
FIG. 13 shows a sheet receiver separated from the clothes dryer shown in FIG. 12.

FIG. 12 is a cross-sectional view of a clothes dryer according to another embodiment of the disclosure. FIG. 13 shows a sheet receiver separated from the clothes dryer shown in FIG. 12.

Hereinafter, a clothes dryer according to another embodiment of the disclosure will be described with reference to FIGS. 12 and 13. In the following descriptions, descriptions overlapping with those given above will be omitted.

Referring to FIGS. 12 and 13, in the clothes dryer according to another embodiment of the disclosure, a sheet receiver 600 may be detachably installed in the guide duct 52.

Referring to FIG. 13, a heat exchanger cover 32 may be detachably coupled to a front lower end of the front cover 30. After a user separates the heat exchanger cover 32 from the front cover 30, the user may separate a blocking member 34 including the guide duct 52 from the main body 10. After the user separates the blocking member 34 from the main body 10, the user may himself/herself clean the heat exchanger 61.

The blocking member 34 may prevent the discharge flow path 81 from communicating with the outside of the main body 10. The heat exchanger cover 32 may function to cover the blocking member 34 from front such that the blocking member 34 is not seen from the outside, rather than preventing air on the discharge flow path 81 from leaking out. The blocking member 34 may seal a predefined passage in which the blocking member 34 is inserted and where the heat exchanger 61 communicates with the outside of the main body 10.

Accordingly, after the blocking member 35 is separated from the main body 10, an access to the heat exchanger 61 from the outside of the main body 10 may be possible, and after the blocking member 34 is coupled to the main body 10, movement of air between the heat exchanger 61 and the outside of the main body 10 may be prevented.

According to an embodiment of the disclosure, the sheet receiver 600 may be detachably installed in the block member 34. The blocking member 34 may include a pair of guides 35 formed on one side of the guide duct 52. The user may separate the blocking member 34 from the main body 10, and then cause the sheet receiver 600 coupled to the guides 35 to slide, thereby separating the sheet receiver 600 from the blocking member 34. On the contrary, after the user replaces a dryer sheet with a new one, the user may cause the sheet receiver 600 to slide on the guides 35, thereby coupling the sheet receiver 600 to the blocking member 34. Then, the user may insert the blocking member 34 into the inside of the main body 10 and couple the heat exchanger cover 33 to the front cover 30, thereby completing replacement of the dryer sheet.

According to another embodiment of the disclosure, foreign materials included in inside air of the drum 20 may be filtered by the filter 40, and air from which foreign materials have been filtered out may be guided from the filter duct 51 to the heat exchanger 61 by the guide duct 52. Because the sheet receiver 600 is installed in the guide duct 52, air entered the guide duct 52 may pass through the sheet receiver 600 located on a flow path of the air and then be guided to the heat exchanger 61. Accordingly, high-temperature and humid air inside the drum 20 may pass through the filter 40 to filter out foreign materials, pass through the sheet receiver 600 to add fragrance, and pass through the heat exchangers 61 and 62 to become high-temperature and dry air, so that the high-temperature and dry air may be supplied to the inside of the drum 20.

According to a concept of the disclosure, the clothes dryer for preventing the dryer sheet from being torn into pieces or from obstructing air circulation inside the drum may be provided.

According to a concept of the disclosure, the clothes dryer including a device and space for fixing the dryer sheet inside the main body may be provided.

According to a concept of the disclosure, the clothes dryer including the sheet receiver detachably coupled to the main body and accommodating the dryer sheet therein may be provided.

According to a concept of the disclosure, the clothes dryer capable of increasing an effect of the dryer sheet by positioning the dryer sheet on an air circulation path may be provided.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A clothes dryer comprising:
   a main body including a laundry inlet;
   a drum rotatably installed inside the main body and configured to receive laundry through the laundry inlet;
   a fan configured to move air along an air flow path which includes a discharge flow path configured to discharge air from an inside of the drum to an outside of the drum;
   a filter duct formed on a rim forming the laundry inlet to form a portion of the discharge flow path;
   a filter configured to filter foreign materials included in air entering the filter duct; and
   a sheet receiver configured to accommodate a dryer sheet, the sheet receiver being detachably installed inside the main body and outside the drum along the discharge flow path,
   wherein the filter duct includes a filter installing portion in which the filter is detachably installed, and a sheet installing portion in which the sheet receiver is detachably installed.

2. The clothes dryer of claim 1, wherein the sheet receiver is detachably installed in front of the filter and air moving along the discharge flow path to the outside of the drum passes through the filter and then passes through the sheet receiver.

3. The clothes dryer of claim 2, wherein the sheet receiver comprises
   a first case including a plurality of air inlets through which air enters, and
   a second case being rotatably coupled to the first case to form an accommodating space accommodating the dryer sheet, and including a plurality of air outlets through which air is discharged.

4. The clothes dryer of claim 1, wherein the sheet receiver comprises a magnet fixed in an inside space of the sheet receiver accommodating the dryer sheet, and the sheet installing portion comprises a magnet sensor configured to sense a magnetic force of the magnet.

5. The clothes dryer of claim 4, wherein the magnet is configured to face the magnet sensor when the sheet receiver is installed in the sheet installing portion.

6. A clothes dryer comprising:

a main body including a laundry inlet;

a door rotatably coupled to a front side of the main body and configured to open and close the laundry inlet;

a drum rotatably installed in the main body and configured to receive laundry through the laundry inlet;

a fan configured to move air along an air flow path including a supply flow path supplying air to a rear of the drum and a discharge flow path discharging air from a front of the drum;

a filter duct formed on a rim forming the laundry inlet to form a portion of the discharge flow path;

a filter configured to filter foreign materials included in air entering the filter duct; and a sheet receiver configured to accommodate a dryer sheet, the sheet receiver being detachably installed inside the main body and outside the drum along the discharge air flow path, wherein the filter duct includes a filter installing portion in which the filter is detachably installed, and a sheet installing portion in which the sheet receiver is detachably installed.

7. The clothes dryer of claim 6, wherein the sheet receiver is detachably installed in front of the filter, and air discharged to the outside of the drum passes through the filter and then passes through the sheet receiver.

8. The clothes dryer of claim 6, wherein the sheet receiver comprises a magnet fixed in an inside space of the sheet receiver accommodating the dryer sheet, and the sheet installing portion comprises a magnet sensor configured to sense a magnetic force of the magnet.

9. A clothes dryer comprising:

a main body including a laundry inlet;

a drum rotatably installed in the main body;

a fan configured to discharge air within the main body;

a filter duct formed on a rim forming the laundry inlet;

a filter detachably installed inside the main body and configured to filter foreign materials included in air discharged by the fan to outside the drum; and a sheet receiver configured to accommodate a dryer sheet, the sheet receiver detachably installed in the main body and outside the drum and positioned in front of the filter such that the air discharged to the outside of the drum passes through the filter and then passes through the dryer sheet, wherein the filter duct includes a filter installing portion in which the filter is detachably installed, and a sheet installing portion in which the sheet receiver is detachably installed.

* * * * *